Sept. 10, 1940.  R. R. CHAPPELL ET AL  2,214,522
CHART DRIVE REGULATOR
Filed June 1, 1939  4 Sheets-Sheet 1
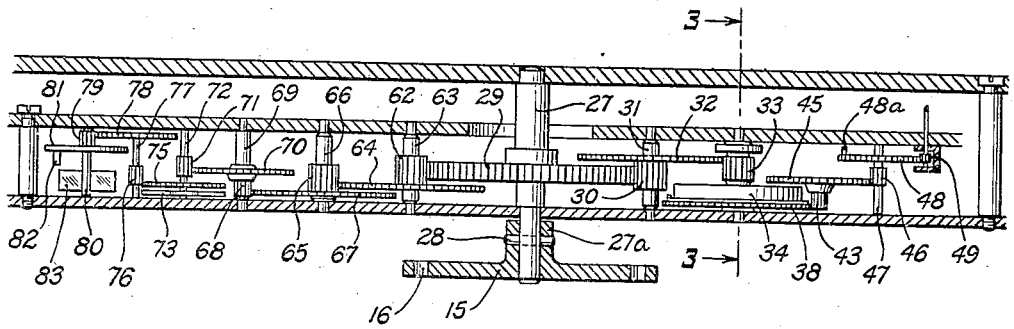
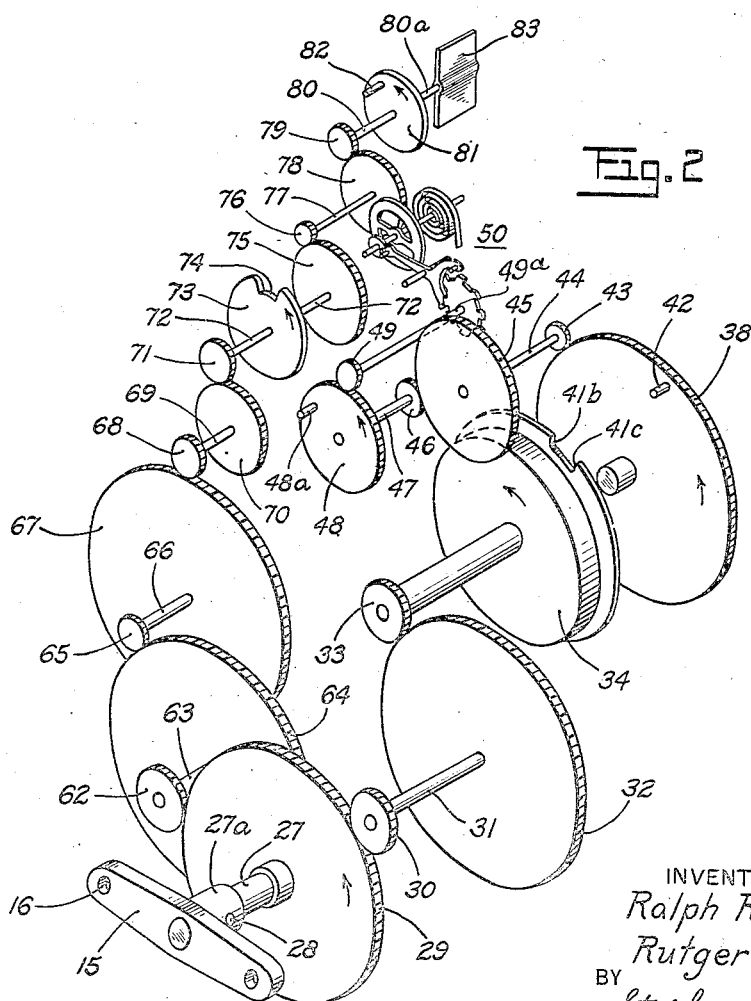
INVENTORS.
Ralph R. Chappell
Rutger B. Colt
BY
Stephen Gerstvik
ATTORNEY.

Sept. 10, 1940. R. R. CHAPPELL ET AL 2,214,522
CHART DRIVE REGULATOR
Filed June 1, 1939 4 Sheets-Sheet 2
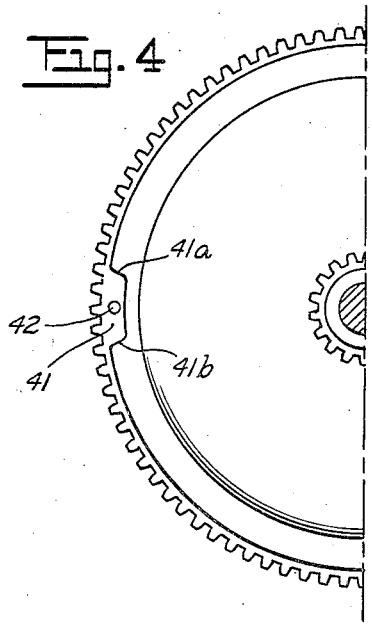
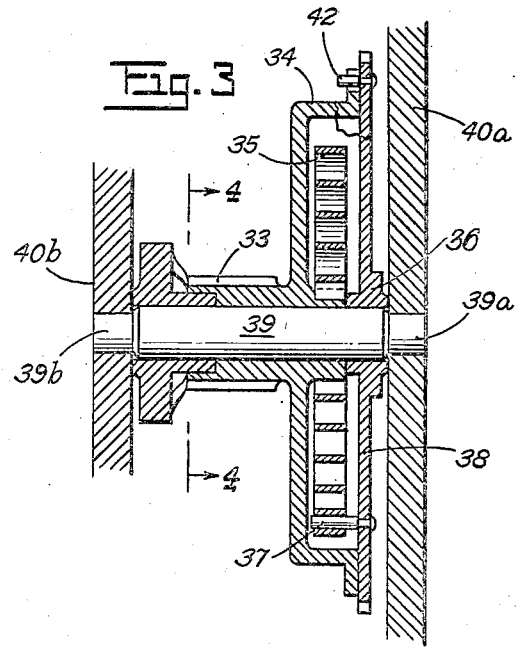
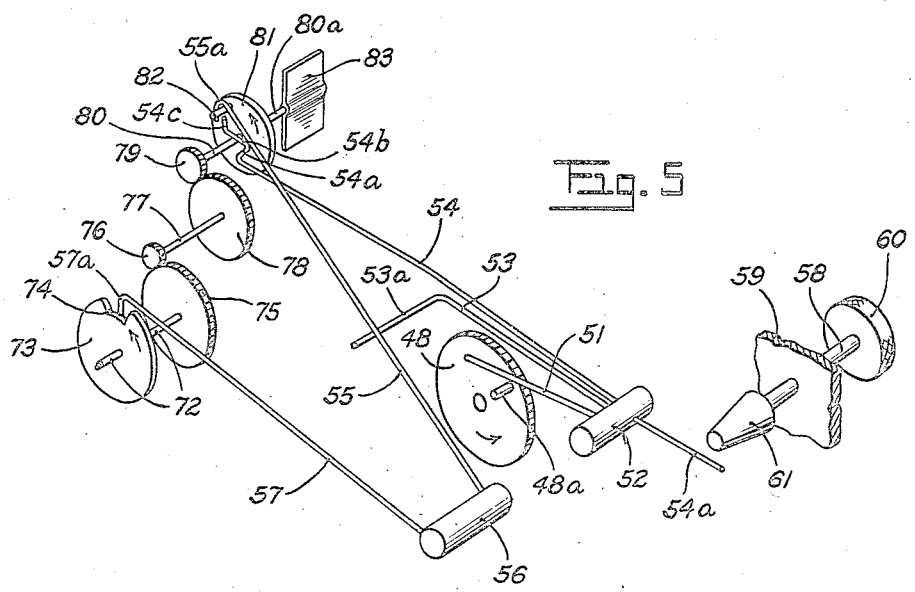
INVENTORS.
Ralph R. Chappell
Rutger B. Colt
BY
Stephen Cerstvik
ATTORNEY.

Sept. 10, 1940.     R. R. CHAPPELL ET AL     2,214,522
CHART DRIVE REGULATOR
Filed June 1, 1939     4 Sheets-Sheet 3
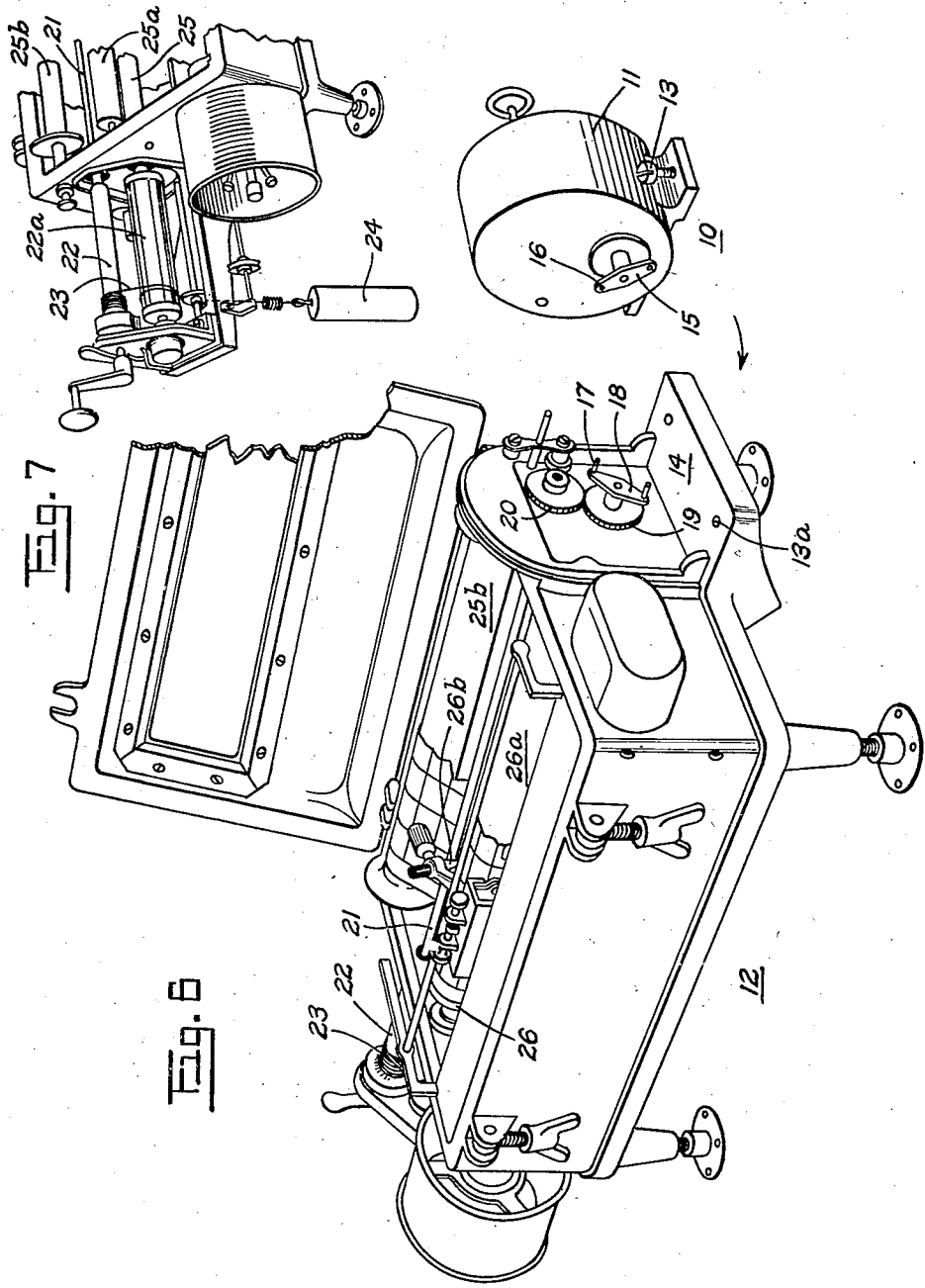
INVENTORS.
Ralph R. Chappell
Rutger B. Colt
BY Stephen Gerstvik
ATTORNEY.

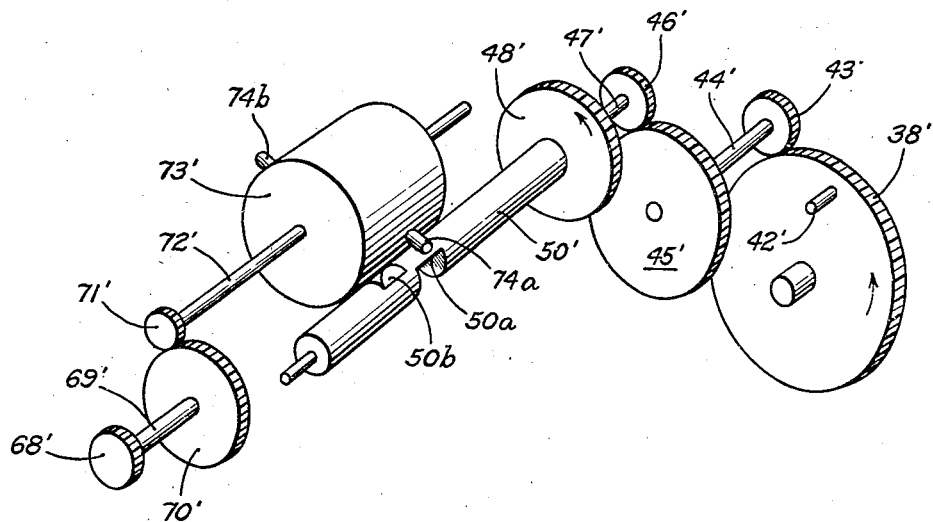

Patented Sept. 10, 1940

2,214,522

UNITED STATES PATENT OFFICE 2,214,522

CHART DRIVE REGULATOR

Ralph R. Chappell, Richmond, Va., and Rutger B. Colt, Baltimore, Md., assignors to Bendix Aviation Corporation, South Bend, Ind., a corporation of Delaware Application June 1, 1939, Serial No. 276,918

15 Claims. (Cl. 271—2.4)

The present invention relates to recording devices and more particularly to novel means for driving one of the elements of such devices.

The invention embodies a novel combination of a heavy weight or other powerful driving element for driving a recording element at fairly high speed, and novel retarding and timing mechanism whereby overbanking of the timing element is eliminated and greater precision of retardation is obtained.

More specifically, the device embodying the invention is provided for the purpose of supplying a powerful driving force to a recorder and opposing said driving force with a timing element to obtain a high precision movement of the record or recording element without overbanking, and to rewind or re-energize the timing element by the driving force.

Similar devices have been utilized in the prior art but such devices have been subject to serious difficulties. For example, upon the utilization of a heavy weight or other powerful driving force for driving a large number of recorder rollers or to drive the chart or other recording element at high speed, a serious overbanking of the clock retarding and timing mechanism has occurred. Such overbanking is highly injurious to the timing mechanism which is delicately constructed for high precision.

Further, upon attempting to vary the driving weight or force in order to reduce overbanking, the variable effect of friction of the driving and other recording rollers was so marked that upon such reduction of the driving force or driving weight in order to reduce overbanking, an increase in the roll friction would stall the recorder driving mechanism.

Other devices, such as fly-ball governors, have been utilized in an attempt to obtain high precision of control and to simultaneously eliminate overbanking, but such governors have not produced the necessary high precision required in certain types of paper or record travel.

In view of the above conditions prevailing in the prior art, one of the objects of the present invention is to provide a novel record or paper travel control for a recorder, whereby the foregoing undesirable characteristics are eliminated.

Another object is to provide a novel combination of a powerful driving weight or force and a high precision timing and retarding element, whereby the overbanking usually caused by a powerful driving force or weight is completely eliminated.

A further object is to provide a novel combination comprising a heavy driving weight or powerful driving force for a paper feed mechanism, and means retarding the feed of said paper, said means comprising a double gear train clock system including an escapement whereby the full force of the weight is modified before being transmitted to the escapement.

Still another object is to provide a novel paper feeding system including a heavy weight and a timing or retarding mechanism comprising a plurality of gear trains, an escapement mechanism, and an actuating element, one of said trains modifying the force of said weight upon said escapement and the other of said trains simultaneously retarding said paper feed and rewinding the actuating element of said timing mechanism.

A further object is to provide a novel paper feeding mechanism including a heavy weight and a timing or retarding mechanism comprising an escapement and a driving element, said escapement and driving element being controlled by one train of gears and a second train of gears connected to said driving weight and said first gear train whereby timed retardation of said paper feed is obtained and said driving element is rewound by said driving weight.

The above and further objects and advantages of the invention will appear more fully hereinafter from a consideration of the detailed description which follows, taken together with the accompanying drawings wherein two embodiments of the invention are illustrated. It is to be expressly understood, however, that the drawings are for the purpose of illustration and description only, and are not designed as a definition of the limits of the invention, reference being primarily had for this purpose to the appended claims.

In the drawings, wherein like reference characters refer to like parts throughout the several views:

Fig. 1 is a developed sectional plan view of one embodiment of the invention, showing the assembled construction of one form of the timing mechanism employed;

Fig. 2 is a schematic perspective view, with the parts of the mechanism rearranged to illustrate more clearly the coaction of the respective parts of the novel timing mechanism shown in Fig. 1;

Fig. 3 is a sectional view of the driving element of the novel timing mechanism, taken on the line 3—3 of Fig. 1

Fig. 4 is a sectional view taken on the line 4—4 of Fig. 3 and rotated 90 degrees;

Fig. 5 is a schematic view illustrating the coaction between the gear trains illustrated in Fig. 1 and Fig. 2 and the control mechanism of the timing device;

Fig. 6 is a perspective view of a complete recorder and chart illustrating the means for mounting and connecting the timing mechanism to the recording mechanism in accordance with the invention;

Fig. 7 is a partial perspective view of the recorder with the supply roll and chart removed, illustrating the coaction between the driving weight and the mechanism controlled by the timing device of the recording mechanism; and Fig. 8 is a perspective view illustrating another embodiment of the control mechanism for the gear trains.

Referring to the drawings, wherein like reference characters refer to like parts throughout the several views, and more particularly to Fig. 6, the novel combination comprising the invention is illustrated, in the present instance, as applied to a water-level or water-stage recorder, although it is to be expressly understood that the invention is not to be so limited but may be applied to any recording device. The timing or retarding element comprises a novel clock mechanism which is designated generally as 10, the casing 11 of which is fastened to recorder 12 by screws 13 cooperating with the threaded holes 13a in the base 14. A female clutch member 15 is connected to the clock mechanism and is provided with openings 16 into which are fitted pins 17 on a male clutch member 18. Clutch member 18 is connected to a gear 19 meshing with gear 20 mounted on and driven by a shaft 21 carrying a roller 22 around which is wound a cable 23, this cable being connected to the roller 22 at one end thereof, wound once completely around the expansion roller 22a and carrying at the other end thereof the driving weight 24 (see Fig. 7). Expansion roller 22a controls the rotation of the feed roll 25 integrally connected therewith. A supply roll 26 carries a chart 26a cooperating with pen 26b, the chart being passed downwardly from the top of supply roll 26, beneath feed roll 25, between the feed roll 25 and friction roll 25a over roll 25a to the take-up roll 25b, the supply roll and chart being omitted in Fig. 7 in order to more clearly illustrate the cooperating elements. The clock mechanism 10 acting through gears 19 and 20, shaft 21, roller 22, cable 23, and expansion roller 22a acts as a retarding force on the feed roll 25 whereby the feed roll is driven by the weight under the control of the clock mechanism and at a rate determined solely by said clock mechanism.

Referring to Figs. 2 and 5, the novel timing or clock mechanism is shown as comprising the female clutch element 15 fastened to shaft 27 by collar 27a and screw 28. Connected to shaft 27 is a gear 29 meshing with pinion 30 on shaft 31 carrying gear 32. Pinion 33 meshing with gear 32 is integrally connected to the spring chamber or barrel 34 within which is mounted the helical spring 35 (see Fig. 3) fastened at one end thereof to a hub 36 integral with chamber 34 and connected to a pin 37 fastened to a gear 38 which is mounted for free rotation about the shaft 39 journalled at its ends 39a and 39b in the plates 40a and 40b, respectively. Chamber 34 is provided with a slot 41 extending circumferentially of the chamber (see Fig. 4). A pin 42 mounted on gear 38 projects into the slot 41 and abuts the ends 41a or 41b thereof at the limits of relative movement between the pin and slot.

Gear 38 meshes with pinion 43 (see Fig. 2) on shaft 44 carrying the gear 45 meshing with pinion 46 on shaft 47 carrying a gear 48. Gear 48 meshes with pinion 49 carried by an escapement shaft 49a, the rotation of which shaft is controlled by an escapement mechanism 50, whereby gear 48 is allowed to rotate at the rate of one revolution per minute. Gear 48 carries a pin 48a which abuts against and thereby coacts with a rod 51 (see Fig. 5) carried by the rotatable shaft 52, to raise and lower the rod 51 once for each revolution of the gear 48. Also carried by shaft 52 are the rods 53 and 54. Rod 53 is provided with a right angled portion 53a at the free end thereof cooperating with a rod 55 provided with a curved portion 55a at its free end and mounted for rotation with shaft 56 carrying a rod 57 provided at the free end thereof with a downwardly extending right angled portion 57a.

Upon rotation of gear 48 as indicated by the arrow in Fig. 5, pin 48a abuts the rod 51 to lift the same and thereby rotate the shaft 52 whereby rod 53 is raised to elevate the rod 55 to in turn rotate shaft 56 to lift the rod 57. A rod 58 reciprocally mounted in a frame 59 is supplied with a finger-operable portion 60 at one end thereof and with a truncated conical shaft portion 61 at the other end thereof projectable over the end 54a of rod 54. When rod 58 is moved to the left as viewed in Fig. 5, a conical element 61 is moved into contact with portion 54a of rod 54 to depress the same and thereby rotate the shaft 52 manually in a clockwise direction. Rod 53 is thereby raised to elevate the rods 55 and 57 which releases the second gear train as will be described in detail later.

Referring to Fig. 2, gear 29 is shown as also meshing with a pinion 62 of a second gear train. Pinion 62 is integral with the shaft 63 carrying the gear 64 meshing with pinion 65 integral with shaft 66 carrying the gear 67 meshing with pinion 68 integral with shaft 69 carrying gear 70 meshing with pinion 71 integral with shaft 72 carrying the disc 73 which is supplied with a circumferential and radially extending slot 74. Also mounted on shaft 72 and carried thereby for rotation therewith, is gear 75 meshing with pinion 76 integral with shaft 77 carrying the gear 78 meshing with gear 79 integral with shaft 80 carrying the disc 81. Disc 81 is provided with a pin 82 whose operation will be described in detail later in connection with the control mechanism as illustrated in Fig. 5. Extension 80a of shaft 80 carries a fan element 83 for retarding rotation of the second gear train.

Referring to Fig. 5, gear 48 is rotated at a constant speed under the control of the escapement mechanism 50, which speed may be chosen as one revolution per minute. Pin 48a rotatable with gear 48 abuts and raises the rod 51 during rotation of gear 48. When rod 51 is raised, shaft 52 is rotated clockwise to thereby elevate rods 53 and 54. Rod 54 is provided with a horizontal right angled portion 54a, a parallel portion 54b, and a vertical right angled portion 54c. When rod 54 is raised, portion 54c will be in the path of rotation of pin 82 mounted on disc 81. When rod 53 is lifted, rod 55 is also lifted thereby rotating shaft 56 to simultaneously raise the rod 57. Simultaneous elevation of rods 55 and 57 lifts the hooked portion 55a of rod 55 out of engagement with pin 82 on disc 81 and simultaneously lifts the downwardly extending portion 51a of rod 57 to avoid engagement with the side of the slot 74. The second gear train comprising gears 29, 62, 64, 65, 67, 68, 70, and 71 is thereupon rotated through the force transmitted from the driving weight 24 acting through the shaft 21, gear 20, gear 19, male clutch member 18, pins 17 inserted into the openings 16 of the female clutch member 15, hub 27a, pin 28 and shaft 27 attached to the gear 29.

The rotation of the various gears is, for the purpose of simplification, assumed to be as shown in Figs. 2 and 5.

As gear 48 continues to rotate, pin 48a, still being considered as in contact with rod 51, the rod 54 continues in its raised position and thereby holds its vertical upwardly extending portion 54c in the path of rotation of pin 82 mounted on disc 81. Just prior to completion of one complete rotation of disc 81, pin 82 abuts the vertical portion 54c of rod 54 and the rotation of the second gear train is momentarily stopped. This momentary stoppage together with the rotational friction produced by the fan element 83 slows down the rotation of the second gear train and prevents the occurrence of a complete rotation of disc 73 before one rotation of gear 48 has been completed, which might occur, were the driving weight 24 sufficiently large and the spring 35 sufficiently weak.

Following this momentary stoppage of the second gear train, gear 48 having continued its rotation, rotates the pin 48a out of contact with the rod 51 whereby rod 51 is released allowing the shaft 52 to rotate counter-clockwise and thereby lower rods 53 and 54. When rod 54 is lowered, its vertically extending portion 54c drops to the position as illustrated in Fig. 5 so that pin 82 is permitted to rotate past the portion 54c as long as the hooked end 55a of rod 55 is maintained in its raised position.

During the first complete rotation of the disc 81, rod 57 and its downwardly extending portion 57a are maintained in their elevated position whereby the slot 74 is permitted to advance beyond the end of the downwardly extending portion 57a. Upon the above described lowering of rod 53, which would ordinarily permit the rods 55 and 57 to assume the lower position, portion 57a of rod 57 rides upon the periphery of disc 73 and thereby maintains rod 55 and hook 55a in elevated position for the duration of one complete rotation of the disc 73. The respective gear trains are so chosen that one rotation of disc 73 permits rotation of gear 33 and chamber 34 an amount equal to one minute of rotation. The spring 35 therefore, is rewound by the action of weight 24 acting through the female clutch member 15 and gear train 29, 30, 32, and 33 and the housing 34 an amount equal to the unwinding of spring 35 during the previous interval of time, which has been chosen in the present instance as one minute. Spring 35 is therefore maintained at practically the same tension throughout the operation of the device, thereby insuring a constant driving force upon the gear 48 regardless of the length of time of operation and regardless of changes in the friction of the driving rollers. By maintaining the storing force of spring 35 at such constancy, the inherent precision of the device is continuously maintained at its highest point.

The strength of spring 35 with respect to the force of the driving weight, and the gear train and fan are chosen in accordance with the type of drive desired for the particular paper feed. If intermittent operation of the paper feed is desired, the spring is chosen so as to be weak with respect to the driving weight. If a practically continuous feed is desired, the spring is made strong with respect to the driving weight, so that a large portion of the force of the driving weight is utilized in winding up the spring 35 instead of rapidly rotating the second gear train. Whether intermittent or continuous feed be utilized, the amount of feed per unit of time is maintained constant at a high precision due to the continuous rewinding of spring 35 and the uniform force thereby exerted by spring 35 upon gear 48 regardless of changes in friction in the rollers governing the paper feed.

It is to be noted that the force of the driving weight is never exerted directly upon the escapement, since spring 35 at all times acts as a resilient buffer between the weight and the escapement, and that a portion of the energy supplied by the force of the driving weight is periodically stored in spring 35 while another portion is utilized to rotate the second gear train. Overbanking is thereby eliminated and a highly precise paper feed is simultaneously obtained at speeds of paper feed heretofore unattainable with great accuracy.

When the weight 24 has completely run down, the force on female clutch member 15 will be removed and the spring 35 will continue to drive the gear 38 until the pin 42 on gear 38 abuts the edge 41b of slot 41. At this time all rotation of gear 48 ceases because even with a remaining tension in the spring 35, none of the force of this tension can be relayed to the gear 48. When the weight 24 is rewound so that its force is again applied to the female clutch member 15, the finger-operated member 60 is reciprocated to depress the end 54a of rod 54 thereby lifting the rod 53 to raise the rods 55 and 57 to thereby permit the second gear train to rotate whereby the weight 24 acting on the first gear train 29 to 33 inclusive, rewinds the spring 35. The reciprocal member 60 is operated a sufficient number of times so that the pin 42 on gear 38 assumes a position midway between the ends 41a and 41b of the slot 41. The force of spring 35 is thereby again applied to the gear 48 and the device resumes operation.

With the spring fully wound, as above described, the operation of the device will now be considered briefly.

As pin 48a of gear 48 reaches rod 51, it raises the latter upwardly together with rods 53, 54, 55 and 57, thereby disengaging hook 55a from pin 82 on disc 81 and lifting hook 57a out of depression 74 on disc 73, whereupon the second gear train is unlocked and permitted to be rotated by the descending weight for a relatively short interval and is momentarily stopped at the end of the first revolution of disc 81 when pin 82 strikes the upraised portion 54c of rod 54. This temporary stopping of disc 81 is to prevent the gear train from gaining too much speed so that it will not rotate faster than to make one revolution of disc 73 in one minute.

Now since gear 48 is continuously rotating, the pin 48a thereon, after a relatively short interval during which the disc 81 was stopped, moves from under the rod 51, thereby dropping rod 54, but rods 55 and 57 remain raised because the disc 73 has advanced sufficiently to cause hook 57a to remain on the periphery thereof, thereby keeping hook 55a in raised position and disengaged from pin 81. Thus the second gear train continues to rotate under the action of the weight until depression 74 comes under hook 57a, whereupon said hook drops into the depression, thereby also dropping rod 55 to cause hook 55a to lock disc 81 and stop the gear train until gear 48 has made one revolution and pin 48a thereon is again ready to lift rods 51, 54, 55 and 57, thus completing one cycle of operation. During each cycle, the second gear train is rotated by the weight to move the record sheet a distance equal to one minute of travel. Also, during each cycle, the descending weight rotates the first gear train to wind the spring 35 an amount equal to the amount unwound during one revolution of gear 48.

The foregoing cycle of operation is repeated every minute so that the spring is continually being rewound as the weight descends.

In Fig. 8 there is illustrated another embodiment of the control structure shown in Fig. 5. The elements in Fig. 8, which perform substantially the same functions as the elements in Figs. 2 and 5, are identified by primed designations of the same reference numerals. It is to be noted by a comparison of Figs. 5 and 8 that the structure of Fig. 8 is a simplification of the structure of the control mechanism of Fig. 5 by the elimination of several parts.

Referring to Fig. 8, gear 48′, instead of being provided with a pin as in the structure of gear 48 of Fig. 5 has a shaft 50′ formed with a pair of notches 50a and 50b located in the periphery thereof. As gear 48′ is rotated at constant speed, the notches 50a and 50b are alternately presented to the pins 74a and 74b, respectively, on cylinder 73′, whereby a half revolution of cylinder 73′ is permitted for each half revolution of gear 48′ or, in other words, cylinder 73′ is permitted to be rotated once per revolution of the gear 48′ in substantially the same manner that rotation of disc 73 of Fig. 5 was permitted by gear 48 thereof. By increasing the number of notches, the rotation of cylinder 73′ can be more nearly synchronized with that of gear 48′ without permitting any transmission to the gear 48′ of the force of rotation exerted on cylinder 73′ by the weight 24. The novel means as illustrated in Fig. 8 simplifies the structure of the device as illustrated in Fig. 5 and performs substantially the same function. It is to be noted, however, that element 73′ rotates in the reverse direction to the rotation of disc 73 of Fig. 5. Such rotation is readily provided by the insertion of an idler gear as is well known in the art.

Novel means are thus provided whereby overbanking of the timing mechanism of a paper feed device is eliminated, high precision of control is obtained, and irregularities and stoppage of operation are prevented.

While only two embodiments of the invention have been illustrated and described, various changes and modifications in form, materials, and relative arrangement of parts, which will now appear to those skilled in the art, may be made without departing from the scope of the invention. Reference is, therefore, to be had to the appended claims for a definition of the limits of the invention.

What is claimed is:

1. In a paper feed mechanism control for a recorder or the like including a driving weight and a retarding timing mechanism, the combination of a first and a second gear train connected in parallel to said weight for rotation thereby, a clock escapement, motion storing means between the first of said gear trains and said escapement, and means controlled by said escapement for controlling the rotation of said second gear train.

2. In a paper feed mechanism for a recorder or the like including a force-storing driving member and a retarding timing mechanism, the combination of a first train of motion transmitting mechanism, a second train of motion transmitting mechanism, an escapement, energy storing means between said first train and said escapement, means controlled by said escapement for controlling the movement of said second train, and means interconnecting said first train and said second train whereby actuation of said second train actuates said first train to restore the energy in said energy restoring means.

3. A paper feed timing mechanism comprising a clock, an escapement in said clock, a pair of gear trains, means including a resilient storing member connecting one of said gear trains to said escapement, a locking element in said second gear train, a second locking element in said gear train, rotatable means controlled by said escapement, means controlled by said rotatable means and simultaneously releasing both of said locking elements, and means controlled by said rotatable means momentarily locking and subsequently releasing one of said locking elements.

4. A paper feed timing mechanism comprising a pair of gear trains, an escapement, one of said gear trains being connected to said escapement, a main spring in said gear train, locking means on the other of said gear trains, means controlled by said escapement for releasing said locking means, and means interconnecting said gear trains whereby upon release of said other gear train said first gear train is actuated to rewind the main spring.

5. In a paper feed timing mechanism, an escapement, a rotatable element controlled by said escapement, a gear train, a pair of locking elements in said gear train, pivoted levers mounted for oscillation whereby said levers are actuated into engagement with and disengagement from said locking means, means on said rotatable element for moving said levers in one direction whereby said locking elements are simultaneously released, means controlled by said rotatable element permitting actuation of said levers in the opposite direction, and means controlled by said rotatable element for momentarily stopping said gear train between the first actuation of said levers and the reversal of direction of actuation thereof.

6. In a paper feed timing mechanism, an escapement, a gear controlled by said escapement, a pin on said gear, a gear train, a pair of discs connected to said gear train for actuation thereby, a slot in one of said discs, a pin on the other of said discs, a rotatable shaft, a lever on said shaft located in the path of movement of said gear pin, a second rotatable shaft, a first rod mounted on said shaft and engaging said disc pin, a second rod mounted on said shaft and engaging said slot, and means controlled by rotation of said first shaft for disengaging said first and second rods whereby proportional rotation of said second shaft is produced.

7. In a paper feed timing mechanism, an escapement, a gear controlled by said escapement, a pin on said gear, a gear train, a pair of discs connected to said gear train for rotation thereby, a slot in one of said discs, a pin on the other of said discs, a rotatable shaft, a lever on said shaft located in the path of movement of said gear, a second rotatable shaft, a first rod mounted on said shaft and engaging said disc pin, a second rod mounted on said shaft and engaging said slot, rod disengaging means controlled by rotation of said first shaft for thereby producing proportional rotation of said second shaft, and finger-operable means for producing rotation of one of said shafts.

8. In a paper feed timing mechanism, an escapement, a gear controlled by said escapement, a pin on said gear, a gear train, a pair of discs connected to said gear train for rotation thereby, a slot in one of said discs, a pin on the other of said discs, an oscillatable shaft, a lever on said shaft located in the path of movement of said gear pin, a second oscillatable shaft, a first rod mounted on said second shaft and engaging said disc pin, a second rod mounted on said shaft and engaging said slot, means interconnecting said first shaft and said second shaft, and a rod on said first shaft oscillatable therewith and movable into and out of the path of movement of said disc pin.

9. In a paper feed timing mechanism, an escapement, a shaft controlled by said escapement, notches formed on the periphery of said shaft, a gear train, a rotatable member controlled by said gear train, and means on said member alternately aligning themselves with said notches and abutting said shaft.

10. In a paper feed mechanism, a control device comprising an escapement, a rotatable element controlled by said escapement, a gear train, a rotatable element controlled by said gear train, staggered elements connected to one of said rotatable elements and staggered openings in the other of said elements, said staggered elements cooperating with said openings whereby said rotatable elements are intermittently relatively rotated.

11. A control mechanism comprising an escapement, a rotatable member controlled by said escapement, a second rotatable member, means exerting a rotative force on said second member, a plurality of staggered notches in one of said rotatable members, and a similar plurality of projecting elements on the other of said rotatable members, said elements extending into said notches upon alignment of said elements and notches and abutting said one member upon disalignment thereof.

12. In a recorder having a record sheet to be moved in accordance with time, time-controlled means comprising means for moving said sheet, a time-controlled suspended weight for actuating said sheet-moving means and adapted to be periodically dropped a predetermined distance after a predetermined interval of time to move said record sheet a predetermined distance equivalent to the distance which would be traversed during said interval of time at a predetermined rate, energy storing means, a rotatable element driven by said energy storing means, an escapement device for controlling the rotation of said rotatable element to maintain its speed constant and at a predetermined rate, means controlled by said rotatable element for periodically releasing and locking said weight so that it drops after a predetermined interval of time as determined by the rate of rotation of said rotatable element and is locked after it has moved a predetermined distance, and means actuated by the dropping of said weight for storing energy in said energy storing means.

13. In a recorder having a record sheet to be moved in accordance with time, time-controlled means comprising means for moving said sheet, a time-controlled suspended weight for actuating said sheet-moving means and adapted to be periodically dropped a predetermined distance after a predetermined interval of time to move said record sheet a predetermined distance equivalent to the distance which would be traversed during said interval of time at a predetermined rate, energy storing means, a rotatable element driven by said energy storing means, an escapement device for controlling the rotation of said rotatable element to maintain its speed constant and at a predetermined rate, means controlled by said rotatable element for periodically releasing and locking said weight so that it drops after a predetermined interval of time as determined by the rotation of said rotatable element and is locked after it has moved a predetermined distance, means actuated by the dropping of said weight for storing energy in said energy storing means, and manually actuated means for actuating said weight releasing and locking means to initially store energy in said energy storing means.

14. In a recorder having a record sheet to be moved in accordance with time, time-controlled means comprising means for moving said sheet, a time-controlled suspended weight for actuating said sheet-moving means and adapted to be periodically dropped a predetermined distance after a predetermined interval of time to move said record sheet a predetermined distance equivalent to the distance which would be traversed during said interval of time at a predetermined rate, a spring wound motor, a rotatable element driven by said spring wound motor, an escapement device for controlling the rotation of said rotatable element to maintain its speed constant and at a predetermined rate, means controlled by said rotatable element for periodically releasing and locking said weight so that it drops after a predetermined interval of time as determined by the rate of rotation of said rotatable element and is locked after it has moved a predetermined distance, and means actuated by the dropping of said weight for storing energy in said spring wound motor.

15. In a recorder having a record sheet to be moved in accordance with time, time-controlled means comprising means for moving said sheet, a time-controlled suspended weight for actuating said sheet-moving means and adapted to be periodically dropped a predetermined distance after a predetermined interval of time to move said record sheet a predetermined distance equivalent to the distance which would be traversed during said interval of time at a predetermined rate, a spring wound motor, a rotatable element driven by said spring wound motor, an escapement device for controlling the rotation of said rotatable element to maintain its speed constant and at a predetermined rate, means controlled by said rotatable element for periodically releasing and locking said weight so that it drops after a predetermined interval of time as determined by the rate of rotation of said rotatable element and is locked after it has moved a predetermined distance, means actuated by the dropping of said weight for storing energy in said spring wound motor, and manually actuated means for actuating said weight releasing and locking means to initially store energy in said spring wound motor.

RALPH R. CHAPPELL.
RUTGER B. COLT.